US011422451B2

(12) United States Patent
Akiyama

(10) Patent No.: US 11,422,451 B2
(45) Date of Patent: Aug. 23, 2022

(54) PROJECTOR HAVING A LIGHT SOURCE APPARATUS WITH STRUCTURES FOR SHIFTING LIGHT

(71) Applicant: SEIKO EPSON CORPORATION, Tokyo (JP)

(72) Inventor: Koichi Akiyama, Azumino (JP)

(73) Assignee: Seiko Epson Corporalion, Tokyo (JP)

(*) Notice: Subject to any disclaimer, the term of this patent is extended or adjusted under 35 U.S.C. 154(b) by 0 days.

(21) Appl. No.: 17/025,243

(22) Filed: Sep. 18, 2020

(65) Prior Publication Data

US 2021/0088889 A1 Mar. 25, 2021

(30) Foreign Application Priority Data

Sep. 20, 2019 (JP) .............................. JP2019-171281

(51) Int. Cl.
*G03B 21/20* (2006.01)
*G02B 27/10* (2006.01)

(52) U.S. Cl.
CPC ....... *G03B 21/2066* (2013.01); *G03B 21/204* (2013.01); *G03B 21/2013* (2013.01); *G02B 27/102* (2013.01)

(58) Field of Classification Search
CPC .. G02B 27/285; G02B 27/102; G02B 27/149; G02B 3/0062; G03B 21/2066; G03B 21/006; G03B 21/2013; G03B 21/204; G03B 21/2053; G03B 21/2073; G03B 21/208

See application file for complete search history.

(56) References Cited

U.S. PATENT DOCUMENTS

| | | | | |
|---|---|---|---|---|
| 9,249,949 | B2* | 2/2016 | Matsubara | ............... F21V 13/12 |
| 2010/0328633 | A1* | 12/2010 | Sato | .................... G02B 19/0057 |
| | | | | 353/99 |
| 2014/0268063 | A1 | 9/2014 | Akiyama et al. | |
| 2017/0168381 | A1* | 6/2017 | Akiyama | ............... G02B 27/30 |
| 2017/0285354 | A1* | 10/2017 | Kijima | ............... G03B 21/2033 |
| 2017/0343891 | A1* | 11/2017 | Sakata | .................. G03B 21/206 |

(Continued)

FOREIGN PATENT DOCUMENTS

| | | | | |
|---|---|---|---|---|
| CN | 211348976 U | * | 8/2020 | ............. G03B 21/20 |
| JP | 2014-182358 | | 9/2014 | |
| JP | 2014-199401 A | | 10/2014 | |

(Continued)

*Primary Examiner* — Magda Cruz
(74) *Attorney, Agent, or Firm* — Dority & Manning, P.A.

(57) ABSTRACT

A projector according to the present disclosure includes a light source apparatus including a light source section including first, second, third, and fourth light emitters sequentially arranged in a row along a first direction that intersects a light exiting direction, a first optical section that shifts light outputted from the second light emitter in a second direction and shifts the light outputted from the second light emitter to a position adjacent to light outputted from the third light emitter, and a second optical section that shifts the light outputted from the third light emitter in the second direction and shifts the light outputted from the third light emitter to a position adjacent to the light outputted from the second light emitter; a light modulator that modulates light outputted from the light source apparatus; and a projection optical apparatus.

20 Claims, 8 Drawing Sheets

(56) References Cited

U.S. PATENT DOCUMENTS

2018/0067387 A1* 3/2018 Matsubara ............. G03B 21/00
2018/0074392 A1* 3/2018 Akiyama ........... G03B 21/2066

FOREIGN PATENT DOCUMENTS

| JP | 2015049461 A | * | 3/2015 | ............. G03B 21/14 |
| JP | 2019-086532 | | 6/2019 | |
| JP | 2019086532 A | * | 6/2019 | ............. G03B 21/14 |
| WO | 2016/117540 A1 | | 7/2016 | |

* cited by examiner

PROJECTOR HAVING A LIGHT SOURCE APPARATUS WITH STRUCTURES FOR SHIFTING LIGHT

The present application is based on, and claims priority from JP Application Ser. No. 2019-171281, filed Sep. 20, 2019, the disclosure of which is hereby incorporated by reference herein in its entirety.

BACKGROUND

1. Technical Field

The present disclosure relates to a projector.

2. Related Art

There has been a projector including a light source apparatus including a plurality of laser light sources. For example, WO 2016/117540 discloses a laser light source apparatus including a plurality of laser light source units that each output laser light and with the plurality of laser light source units so disposed as to be adjacent in series to each other and a projector including the laser light source apparatus.

When a plurality of light emitters are arranged in a row, as in the laser light source apparatus described in WO 2016/117540, a plurality of light beams outputted from the plurality of light emitters are also arranged in a row. The light flux formed of the plurality of light beams has a cross-sectional shape perpendicular to the center axis of the light flux and elongated in one direction. When the illumination receiving area of an optical element, a light modulator, or any other component in the projector is illuminated with the light flux, the illuminance distribution on the illumination receiving area is nonuniform, resulting in brightness unevenness, color unevenness, and other problems on a projected image.

SUMMARY

A projector according to an aspect of the present disclosure includes a light source apparatus including a light source section including a first light emitter, a second light emitter, a third light emitter, and a fourth light emitter sequentially arranged in a row along a first direction that intersects a light exiting direction, a first optical section that shifts a light beam outputted from the second light emitter of the light source section in a second direction that intersects the light exiting direction and the first direction and shifts the light beam outputted from the second light emitter of the light source section to a position adjacent to a light beam outputted from the third light emitter of the light source section, and a second optical section that shifts the light beam outputted from the third light emitter of the light source section in the second direction and shifts the light beam outputted from the third light emitter of the light source section to a position adjacent to the light beam outputted from the second light emitter of the light source section that is a position different from the position of the light beam outputted from the second light emitter; a light modulator that modulates light outputted from the light source apparatus in accordance with image information to produce image light; and a projection optical apparatus that projects the image light.

In the projector according to the aspect of the present disclosure, the first optical section may include a first optical element that shifts the light beam outputted from the second light emitter in the second direction and a second optical element that shifts the light beam outputted from the second light emitter in the first direction.

In the projector according to the aspect of the present disclosure, the first optical element may have a first reflection surface that reflects the light beam outputted from the second light emitter in the second direction and a second reflection surface that reflects the light beam reflected off the first reflection surface in the light exiting direction, and the second optical element may have a third reflection surface that reflects the light beam reflected off the second reflection surface in the first direction and a fourth reflection surface that reflects the light beam reflected off the third reflection surface in the light exiting direction.

In the projector according to the aspect of the present disclosure, the second optical section may include a third optical element that shifts the light beam outputted from the third light emitter in the second direction and a fourth optical element that shifts the light beam outputted from the third light emitter in the first direction.

In the projector according to the aspect of the present disclosure, the third optical element may have a fifth reflection surface that reflects the light beam outputted from the third light emitter in the second direction and a sixth reflection surface that reflects the light beam reflected off the fifth reflection surface in the light exiting direction, and the fourth optical element may have a seventh reflection surface that reflects the light beam reflected off the sixth reflection surface in the first direction and an eighth reflection surface that reflects the light beam reflected off the seventh reflection surface in the light exiting direction.

In the projector according to the aspect of the present disclosure, the light beam outputted from the second light emitter and the light beam outputted from the third light emitter may be shifted along the second direction but in opposite directions.

In the projector according to the aspect of the present disclosure, the light beam outputted from the second light emitter and the light beam outputted from the third light emitter may be shifted along the first direction but in opposite directions.

In the projector according to the aspect of the present disclosure, the light source apparatus may further include a wavelength converter on which the light beam outputted from each of the first, second, third, and fourth light emitters is incident.

In the projector according to the aspect of the present disclosure, the light beam outputted from each of the first, second, third, and fourth light emitters may have an elliptical cross-sectional shape perpendicular to a chief ray of the light beam. A minor axis direction of the elliptical shape may coincide with the first direction, and a major axis direction of the elliptical shape may coincide with the second direction.

In the projector according to the aspect of the present disclosure, the light source section may further include a fifth light emitter located between the second light emitter and the third light emitter in the first direction.

DESCRIPTION OF EXEMPLARY EMBODIMENTS

First Embodiment

A projector according to the present embodiment is an example of a liquid crystal projector including a light source apparatus using a semiconductor laser.

In the following drawings, components are drawn at different dimensional scales in some cases for clarity of each of the components.

Figure 1:
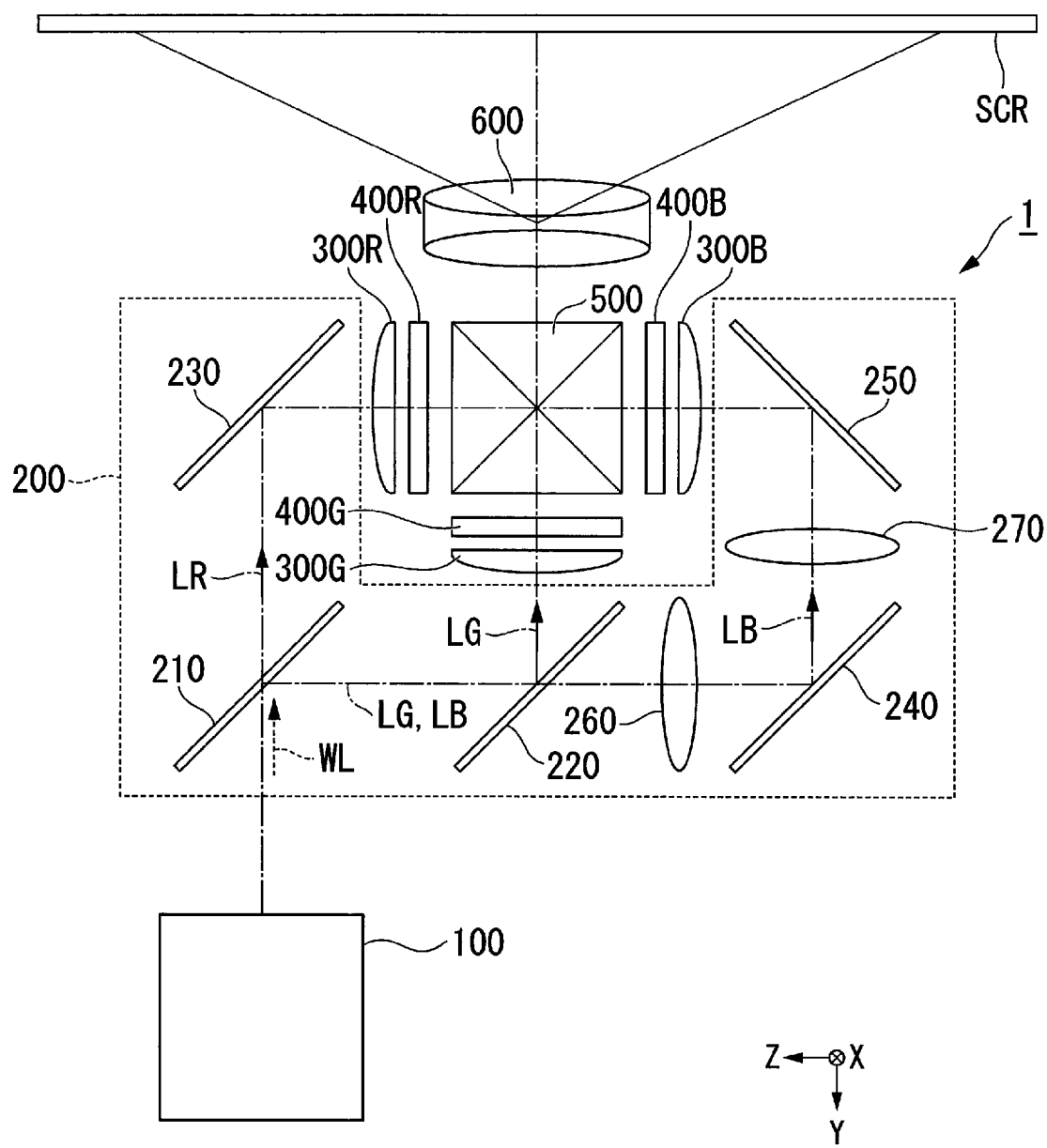
FIG. 1 is a schematic configuration diagram of a projector according to a first embodiment.

FIG. 1 is a schematic configuration diagram of a projector 1 according to the present embodiment.

The projector 1 includes an illuminator 100, a color separation/light guide system 200, a light modulator for red light 400R, a light modulator for green light 400G, a light modulator for blue light 400B, a cross dichroic prism 500, and a projection optical apparatus 600, as shown in FIG. 1. The light modulator for red light 400R, the light modulator for green light 400G, and the light modulator for blue light 400B in the present embodiment correspond to the light modulator in the appended claims.

In the present embodiment, the illuminator 100 outputs white illumination light WL containing red light LR, green light LG, and blue light LB. The configuration of the illuminator 100 will be described later.

The color separation/light guide system 200 includes a first dichroic mirror 210, a second dichroic mirror 220, a first reflection mirror 230, a second reflection mirror 240, a third reflection mirror 250, a first relay lens 260, and a second relay lens 270. The color separation/light guide system 200 separates the illumination light WL from the illuminator 100 into the red light LR, the green light LG, and the blue light LB, guides the red light LR to the light modulator for red light 400R, guides the green light LG to the light modulator for green light 400G, and guides the blue light LB to the light modulator for blue light 400B.

A field lens 300R is disposed between the color separation/light guide system 200 and the light modulator for red light 400R. A field lens 300G is disposed between the color separation/light guide system 200 and the light modulator for green light 400G. A field lens 300B is disposed between the color separation/light guide system 200 and the light modulator for blue light 400B.

The first dichroic mirror 210 transmits the red light LR and reflects the green light LG and the blue light LB. The second dichroic mirror 220 receives the green light LG and the blue light LB reflected off the first dichroic mirror 210, reflects the green light LG, and transmits the blue light LB. The first reflection mirror 230 reflects the red light LR. The second reflection mirror 240 and the third reflection mirror 250 reflect the blue light LB.

The light modulator for red light 400R, the light modulator for green light 400G, and the light modulator for blue light 400B each modulate the color light incident thereon in accordance with image information to form image light. The light modulator for red light 400R, the light modulator for green light 400G, and the light modulator for blue light 400B are each formed of a liquid crystal panel.

Although not shown, a light-incident-side polarizer is disposed between the field lens 300R and the light modulator for red light 400R. A light-incident-side polarizer is disposed between the field lens 300G and the light modulator for green light 400G. A light-incident-side polarizer is disposed between the field lens 300B and the light modulator for blue light 400B. A light-exiting-side polarizer is disposed between the light modulator for red light 400R and the cross dichroic prism 500. A light-exiting-side polarizer is disposed between the light modulator for green light 400G and the cross dichroic prism 500. A light-exiting-side polarizer is disposed between the light modulator for blue light 400B and the cross dichroic prism 500.

The cross dichroic prism 500 combines the image light outputted from the light modulator for red light 400R, the image light outputted from the light modulator for green light 400G, and the image light outputted from the light modulator for blue light 400B with one another to form a color image. The cross dichroic prism 500 is formed by bonding four right-angled prisms to each other and therefore has a substantially square shape in a plan view, and dielectric multilayer films are provided along the substantially X-letter-shaped interfaces between the bonded right-angled prisms.

The color image having exited out of the cross dichroic prism 500 is enlarged and projected by the projection optical apparatus 600 on a screen SCR.

The illuminator 100 will be described below.

Figure 2:
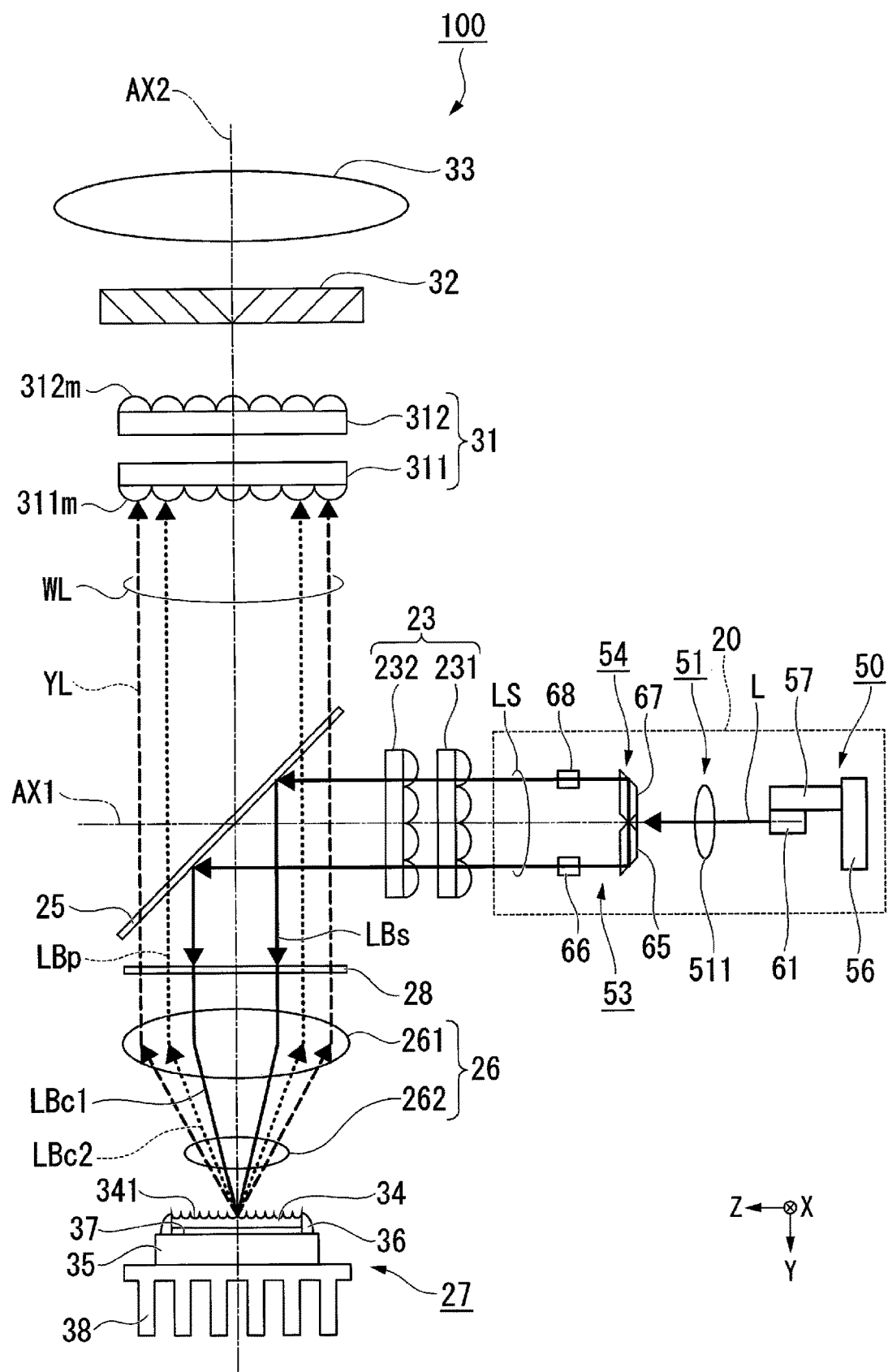
FIG. 2 is a schematic configuration diagram of an illuminator.

FIG. 2 is a schematic configuration diagram of the illuminator 100.

The illuminator 100 includes a light source apparatus 20, a homogenizer system 23, a light combiner 25, a retardation film 28, a light collection system 26, a wavelength converter 27, an optical integration system 31, a polarization converter 32, and a superimposing lens 33, as shown in FIG. 2.

The light source apparatus 20, the homogenizer system 23, and the light combiner 25 are sequentially arranged along an optical axis AX1 of the light source apparatus 20. The wavelength converter 27, the light collection system 26, the retardation film 28, the light combiner 25, the optical integration system 31, the polarization converter 32, and the superimposing lens 33 are sequentially arranged along an illumination optical axis AX2. In the present specification, the illumination optical axis AX2 is defined as an axis along which the chief ray of the light outputted from the illuminator 100 travels. The optical axis AX1 and the illumination optical axis AX2 are present in the same plane and perpendicular to each other.

The light source apparatus 20 will be described below.

Figure 3:
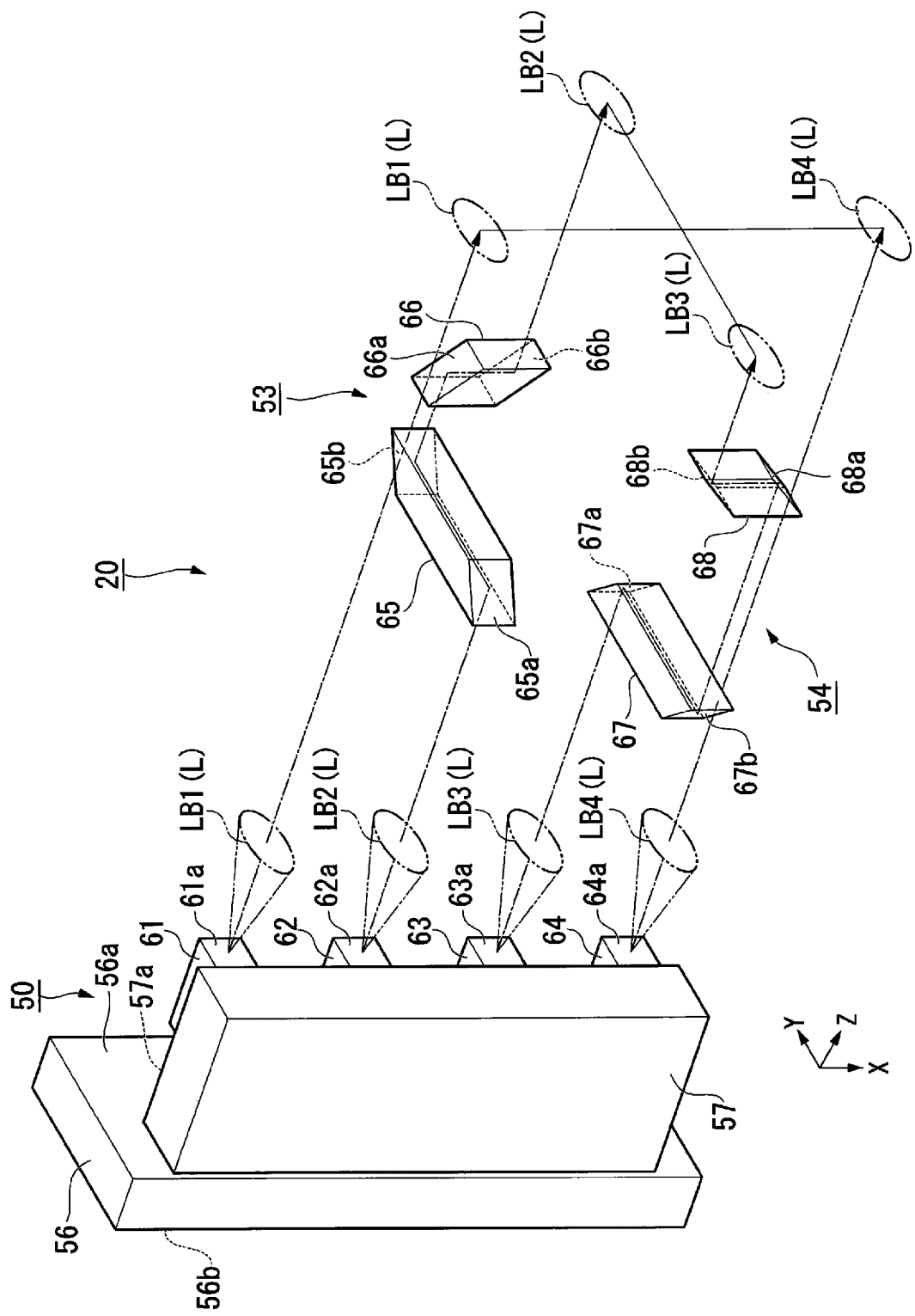
FIG. 3 is a perspective view of a light source apparatus.

FIG. 3 is a perspective view of the light source apparatus 20. In FIG. 3, no collimator system 51 is shown for clarity of the figure.

The light source apparatus 20 includes alight source section 50, a collimator system 51 (see FIG. 2), a first optical section 53, and a second optical section 54, as shown in FIG. 3.

The light source section 50 includes a substrate 56, a support member 57, a first light emitter 61, a second light emitter 62, a third light emitter 63, and a fourth light emitter 64.

The substrate 56 has a first surface 56a and a second surface 56b and is made of a metal material that excels in heat dissipation, for example, aluminum and copper. The support member 57 is provided on the first surface 56a of the substrate 56. The support member 57 is made of a metal material that excels in heat dissipation, for example, aluminum and copper, as is the substrate 56. The support member 57 has a mounting surface 57a, on which the plurality of light emitters 61, 62, 63, and 64 are mounted. The mounting surface 57a has an oblong shape having a lengthwise direction and a widthwise direction when viewed in the direction of a normal to the mounting surface 57a.

The plurality of light emitters 61, 62, 63, and 64 are arranged on the mounting surface 57a of the support member 57 at intervals along the lengthwise direction of the mounting surface 57a. In the present embodiment, the first light emitter 61, the second light emitter 62, the third light emitter 63, and the fourth light emitter 64 provided in the light source section 50 are sequentially arranged in a row along a first direction that intersects a light exiting direction in which light L exits. The light exiting direction of the light L is the direction along the chief ray of the light L.

In the following description, an XYZ orthogonal coordinate axes are set, and the following directions are defined: an axis-X direction (first direction) is the direction in which the plurality of light emitters 61, 62, 63, and 64 are arranged; an axis-Z direction is the direction in which light is outputted from each of the light emitters 61, 62, 63, and 64; and an axis-Y direction (second direction) is the direction perpendicular to the axis-X and axis-Z directions.

The plurality of light emitters 61, 62, 63, and 64 are so mounted on the support member 57 that rectangular light emitting surfaces 61a, 62a, 63a, and 64a are substantially flush with a lengthwise end surface 57c of the support member 57. The light exiting direction of the light L outputted from each of the light emitters 61, 62, 63, and 64 therefore coincides with the widthwise direction of the support member 57. The direction in which the plurality of light emitters 61, 62, 63, and 64 are arranged intersects the light exiting direction of the light L. The light L outputted from each of the emitters 61, 62, 63, and 64 has an elliptical cross-sectional shape perpendicular to the chief ray of the light L. The direction of the minor axis of the elliptical shape coincides with the direction in which the plurality of light emitters 61, 62, 63, and 64 are arranged (axis-X direction). The direction of the major axis of the elliptical shape coincides with the axis-Y direction. The light L outputted from each of the emitters 61, 62, 63, and 64 may not have a perfect elliptical cross-sectional shape perpendicular to the chief ray of the light L.

The plurality of light emitters 61, 62, 63, and 64 are each formed of a blue semiconductor laser that outputs blue light. The blue semiconductor laser outputs blue light having a peak wavelength that belongs to a wavelength range, for example, from 380 to 495 nm. The light source section 50 therefore outputs a light flux containing four blue light beams arranged in the axis-X direction. In the following description, the light L outputted from the first light emitter 61 is referred to as a first light beam LB1, the light L outputted from the second light emitter 62 is referred to as a second light beam LB2, the light L outputted from the third light emitter 63 is referred to as a third light beam LB3, and the light L outputted from the fourth light emitter 64 is referred to as a fourth light beam LB4. The overall light containing the four light beams L outputted from the four light emitters 61, 62, 63, and 64 is referred to as a light flux LS.

The collimator system 51 (see FIG. 2) is formed of a plurality of collimator lenses 511. The collimator lenses 511 are provided in correspondence with the light emitters 61, 62, 63, and 64 and arranged in a row along the axis-X direction. The collimator lenses 511 each parallelize the light beam L outputted from the corresponding one of the light emitters 61, 62, 63, and 64.

The first optical section 53 includes a first prism (first optical element), which shifts in the axis-Y direction the second light beam LB2 outputted from the second light emitter 62, and a second prism 66 (second optical element), which shifts in the axis-X direction the second light beam LB2 outputted from the second light emitter 62.

The first prism 65 has the shape of a parallelogram when viewed in the axis-X direction. The first prism 65 has a first reflection surface 65a, which reflects in the axis-Y direction the second light beam LB2 outputted from the second light emitter 62, and a second reflection surface 65b, which reflects in the axis-Z direction the second light beam LB2 reflected off the first reflection surface 65a. The first reflection surface 65a and the second reflection surface 65b are parallel to each other. The first prism 65 is so oriented that the lengthwise direction thereof is parallel to the axis-Y direction. Further, the first prism 65 is so disposed that the first reflection surface 65a inclines by 45° with respect to the chief ray of the second light beam LB2 outputted from the second light emitter 62. The second light beam LB2 outputted from the second light emitter 62 is thus reflected off the first reflection surface 65a in the axis-Y direction, then passes through the interior of the first prism 65, and is reflected off the second reflection surface 65b in the axis-Z direction.

The second prism 66 has the shape of a parallelogram when viewed in the axis-Y direction. The second prism 66 has a third reflection surface 66a, which reflects in the axis-X direction the second light beam LB2 reflected off the second reflection surface 65b, and a fourth reflection surface 66b, which reflects in the axis-Z direction the second light beam LB2 reflected off the third reflection surface 66a. The third reflection surface 66a and the fourth reflection surface 66b are parallel to each other. The second prism 66 is so oriented that the lengthwise direction thereof is parallel to the axis-X direction. Further, the second prism 66 is so disposed that the third reflection surface 66a inclines by 45° with respect to the chief ray of the second light beam LB2 reflected off the second reflection surface 65b of the first prism 65. The second light beam LB2 reflected off the second reflection surface 65b of the first prism 65 is thus reflected off the third reflection surface 66a in the axis-X direction, then passes through the interior of the second prism 66, and is reflected off the fourth reflection surface 66b in the axis-Z direction.

The second optical section 54 includes a third prism (third optical element), which shifts in the axis-Y direction the third light beam LB3 outputted from the third light emitter 63, and a fourth prism 68 (fourth optical element), which shifts in the axis-X direction the third light beam LB3 outputted from the third light emitter 63.

The third prism 67 has the shape of a parallelogram when viewed in the axis-X direction. The third prism 67 has a fifth reflection surface 67a, which reflects in the axis-Y direction the third light beam LB3 outputted from the third light emitter 63, and a sixth reflection surface 67b, which reflects in the axis-Z direction the third light beam LB3 reflected off the fifth reflection surface 67a. The fifth reflection surface 67a and the sixth reflection surface 67b are parallel to each other. The third prism 67 is so oriented that the lengthwise direction thereof is parallel to the axis-Y direction. Further, the third prism 67 is so disposed that the fifth reflection surface 67a inclines by 45° with respect to the chief ray of the third light beam LB3 outputted from the third light emitter 63. The third light beam LB3 outputted from the third light emitter 63 is thus reflected off the fifth reflection surface 67a in the axis-Y direction, then passes through the interior of the third prism 67, and is reflected off the sixth reflection surface 67b in the axis-Z direction.

The fourth prism 68 has the shape of a parallelogram when viewed in the axis-Y direction. The fourth prism 68 has a seventh reflection surface 68a, which reflects in the axis-X direction the third light beam LB3 reflected off the sixth reflection surface 67b, and an eighth reflection surface 68b, which reflects in the axis-Z direction the third light beam LB3 reflected off the seventh reflection surface 68a. The seventh reflection surface 68b and the eighth reflection surface 68b are parallel to each other. The fourth prism 68 is so oriented that the lengthwise direction thereof is parallel to the axis-X direction. Further, the fourth prism 68 is so disposed that the seventh reflection surface 68a inclines by 45° with respect to the chief ray of the third light beam LB3 reflected off the sixth reflection surface 67b of the third prism 67. The third light beam LB3 reflected off the sixth reflection surface 67b of the third prism 67 is thus reflected off the seventh reflection surface 68b in the axis-X direction, then passes through the interior of the fourth prism 68, and is reflected off the eighth reflection surface 68b in the axis-Z direction.

Figure 4:
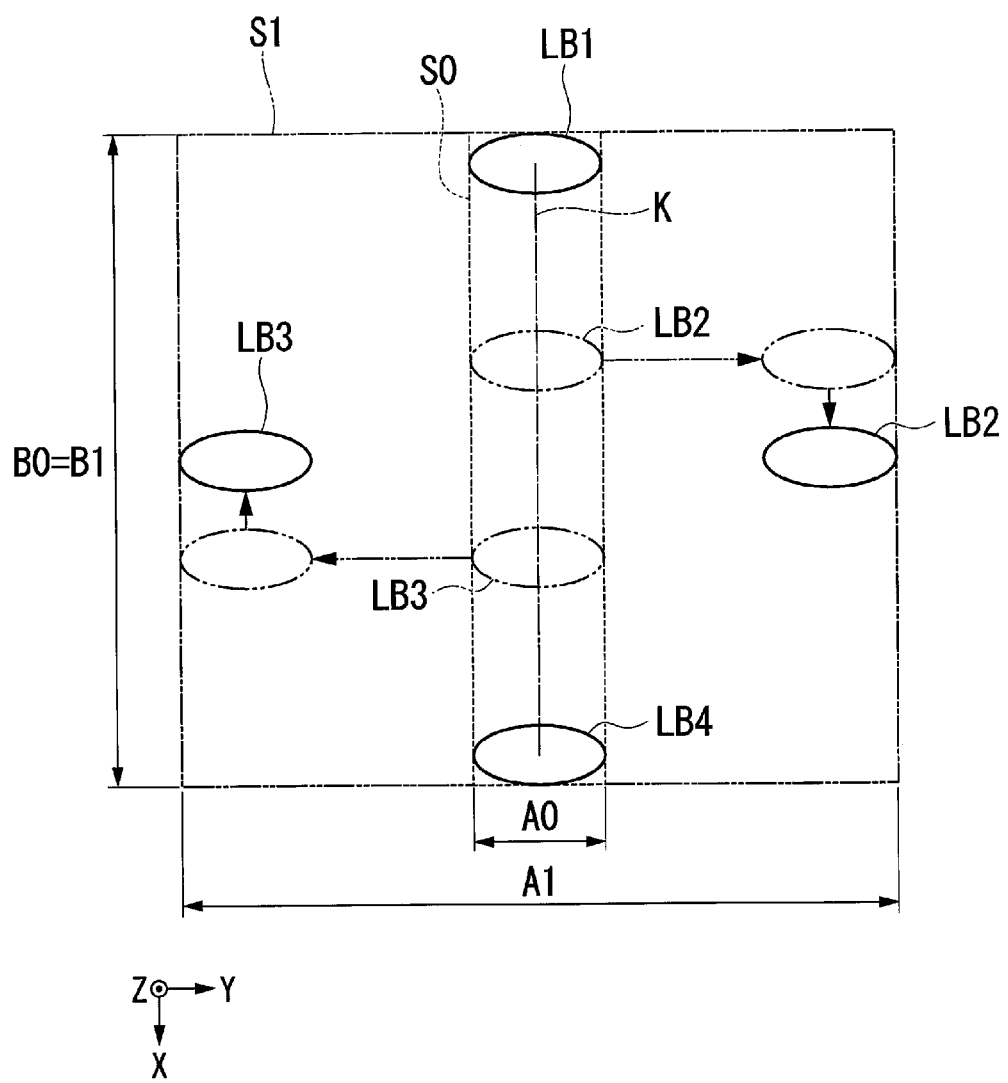
FIG. 4 shows the paths along which optical sections cause light to travel.

FIG. 4 shows the paths along which the optical sections 53 and 54 cause light to travel.

The first to fourth light beams LB1, LB2, LB3, and LB4 outputted from the first to fourth light emitters 61, 62, 63, and 64 are arranged in a row in the axis-X direction before the second light beam LB2 and the third light beam LB3 enter the first optical section 53 and the second optical section 54, respectively, as shown in FIG. 4. An imaginary straight line that connects the centers of the first to fourth light beams LB1, LB2, LB3, and LB4 arranged in a row with each other is referred to as a reference line K. The first prism 65 in the first optical section 53 shifts the second light L counted from above in FIG. 4, that is, the second light beam LB2 outputted from the second light emitter 62 toward one side of the reference line K in the axis-Y direction, that is, toward the right side in FIG. 4, and the second prism 66 then shifts the second light beam LB2 toward one side in the axis-X direction, that is, toward the lower side in FIG. 4.

The third prism 67 in the second optical section 54 shifts the third light L counted from above in FIG. 4, that is, the third light beam LB3 outputted from the third light emitter 63 toward the other side of the reference line K in the axis-Y direction, that is, toward the left side in FIG. 4, and the fourth prism 68 then shifts the third light beam LB3 toward the other side in the axis-X direction, that is, toward the upper side in FIG. 4.

As described above, the first optical section 53 shifts the second light beam LB2 outputted from the second light emitter 62 of the light source section 50 in the axis-Y direction to a position adjacent to the third light beam LB3 outputted from the third light emitter 63. The second optical section 54 shifts the third light beam LB3 outputted from the third light emitter 63 of the light source section 50 in the axis-Y direction to a position adjacent to the second light beam LB2 outputted from the second light emitter 62 but different from the position of the second light beam LB2.

That is, the second light beam LB2 outputted from the second light emitter 62 and the third light beam LB3 outputted from the third light emitter 63 shift along the axis-Y direction but in opposite directions. Further, the second light beam LB2 outputted from the second light emitter 62 and the third light beam LB3 outputted from the third light emitter 63 shift along the axis-X direction but in opposite directions.

On the other hand, the first light beam LB1 outputted from the first light emitter 61 and the fourth light beam LB4 outputted from the fourth light emitter 64 do not enter the first optical section 53 or the second optical section 54 but travel straight. As a result, the first to fourth light beams LB1, LB2, LB3, and LB4 outputted from the first to fourth light emitters 61, 62, 63, and 64 are arranged in a position after the second light beam LB2 and the third light beam LB3 exit out of the first optical section 53 and the second optical section 54 in such a way that the first light beam LB1 and the fourth light beam LB4 are arranged in the axis-X direction and the second light beam LB2 and the third light beam LB3 face each other in the axis-Y direction with the reference line K sandwiched therebetween.

The homogenizer system 23 includes a first multi-lens array 231 and a second multi-lens array 232, as shown in FIG. 2. The homogenizer system 23 along with the light collection system 26 homogenizes the illuminance distribution of the light flux LS on the wavelength converter 27, which is an illumination receiving area. The light flux LS having passed through the homogenizer system 23 enters the light combiner 25.

The light combiner 25 is formed of an optical element having a polarization separation function in association with the blue light. That is, the optical element has a polarization separation function that reflects the S-polarized component of the blue light out of the light incident on the optical element and transmits the P-polarized component of the blue light out of the incident light. On the other hand, the light combiner 25 has a color separation function that causes the light combiner 25 to transmit yellow fluorescence YL, which is outputted from the wavelength converter 27 and belongs to a wavelength range different from the wavelength range to which the blue light belongs, irrespective of the polarization state of the fluorescence YL. In the present embodiment, the blue light flux LS outputted from the light source apparatus 20 is S-polarized light flux with respect to the light combiner 25 when entering the light combiner 25.

The retardation film 28 is provided between the light combiner 25 and the light collection system 26. The retardation film 28 is formed of a quarter wave plate. The thus configured retardation film 28 converts an S-polarized light flux LBs reflected off the light combiner 25, for example, into a right-handed circularly polarized light flux LBc1. The blue light flux LBc1 enters the light collection system 26.

The light collection system 26 is formed of a first lens 261 and a second lens 262. The light flux LBc1 having traveled via the homogenizer system 23 and the light collection system 26 is incident on the illumination receiving area of the wavelength converter 27 with the illuminance distribution of the light flux LBc1 homogenized.

The wavelength converter 27 converts the wavelength of part of the light flux LBc1 having exited out of the light collection system 26, outputs the resultant fluorescence YL, and diffusively reflects the remainder of the light flux LBc1. The wavelength converter 27 includes a phosphor layer 34, a substrate 35, which supports the phosphor layer 34, and a fixing member 36, which fixes the phosphor layer 34 to the substrate 35. The light beams outputted from the first light emitter 61, the second light emitter 62, the third light emitter 63, and the fourth light emitter 64 enter the wavelength converter 27.

The phosphor layer 34 is provided on a first surface of the substrate 35, and a heat sink 38 is provided on a second surface of the substrate 35. The wavelength converter 27 can dissipate heat via the heat sink 38, whereby thermal deterioration of the phosphor layer 34 can be suppressed.

The phosphor layer 34 contains a ceramic phosphor that converts the blue light flux LBc1 into the fluorescence YL, which belongs to a wavelength range different from the wavelength range to which the light flux LBc1 belongs. The wavelength band to which the fluorescence YL belongs, for example, from 490 to 750 nm, and the fluorescence YL is yellow light containing a green light component and a red light component. The phosphor layer 34 may contain a single-crystal phosphor. The phosphor layer 34 has an oblong planar shape substantially similar to the shape of the illumination receiving area of each of the liquid crystal panels that form the light modulators 400R, 400G, and 400B viewed from the incident direction (the axis-Y direction) of the light flux LBc1.

The phosphor layer 34 contains, for example, an yttrium-aluminum-garnet-based (YAG-based) phosphor. Consider YAG:Ce, which contains cerium (Ce) as an activator, by way of example, and the phosphor layer 34 can be made, for example, of a material produced by mixing raw material powder containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

A diffusive reflector 341, which diffusively reflects part of the light flux LBc1, is provided on a surface of the phosphor layer 34 that is the surface on which the light flux LBc1 is incident. The diffusive reflector 341 has a convex structure, a concave structure, or a convex/concave structure formed, for example, by performing texture treatment, dimple treatment, or any other treatment on one surface of the phosphor layer 34. The diffusive reflector 341 may be directly formed across one surface of the phosphor layer 34, or the diffusive reflector 341 may be formed as part of a light transmissive member separate from the phosphor layer 34 and the light transmissive member may be attached to the phosphor layer 34. Further, a reflection layer for controlling the reflectance of the blue light may be provided on the light incident surface of the diffusive reflector 341.

Part of the light flux LBc1 having entered the wavelength converter 27 is diffusively reflected off the surface of the diffusive reflector 341. The diffusive reflector 341 reflects, for example, the right-handed circularly polarized light flux LBc1 and converts it into a left-handed circularly polarized, diffused light flux LBc2. On the other hand, part of the light flux LBc1 having entered the wavelength converter 27 passes through the diffusive reflector 341 and enters the phosphor layer 34. The phosphor layer 34 produces the yellow fluorescence YL when excited with the blue light flux LBc1. The fluorescence YL passes through the diffusive reflector 341 and exits out of the wavelength converter 27. Out of the fluorescence YL produced by the phosphor layer 34, the component that travels toward the substrate 35 is reflected off a reflection layer 37 provided between the phosphor layer 34 and the substrate 35 and exits out of the wavelength converter 27.

The light flux containing the blue diffused light LBc2 and the yellow fluorescence YL having exited out of the wavelength converter 27 enters the light collection system 26.

The light collection system 26 has the function of a pickup system that parallelizes the light flux that enters the light collection system 26.

Out of the light flux having entered the retardation film 28, the diffused light beam LBc2 formed of left-handed circularly polarized blue light is converted by the retardation film 28 into a P-polarized blue light flux LBp. The blue light flux LBp having exited out of the retardation film 28 enters the light combiner 25 again. The blue light flux LBp, which is P-polarized light as a result of the conversion performed by the retardation film 28, passes through the light combiner 25. On the other hand, the fluorescence YL outputted from the phosphor layer 34 is nonpolarized light having polarization directions that are not aligned with one another. The yellow fluorescence YL passes through the light combiner 25.

As described above, the light flux containing the blue light flux LBp and the fluorescence YL enters the optical integration system 31. The combination of the blue diffused light and the yellow fluorescence YL produces the white illumination light WL.

The optical integration system 31 includes a first multi-lens array 311 and a second multi-lens array 312. The first multi-lens array 311 includes a plurality of first lenses 311m, which divide the illumination light WL into a plurality of sub-light fluxes.

The lens surface of the first multi-lens array 311 (surfaces of first lenses 311m) is conjugate with an image formation area of each of the light modulators 400R, 400G, and 400B. The first lenses 311m therefore each have a rectangular shape substantially similar to the shape of the image formation area of each of the light modulators 400R, 400G, and 400B. The sub-light fluxes having exited out of the first multi-lens array 311 are therefore efficiently incident on the image formation area of each of the light modulators 400R, 400G, and 400B.

The second multi-lens array 312 includes a plurality of second lenses 312m corresponding to the plurality of first lenses 311m of the first multi-lens array 311. The second multi-lens array 312, along with the superimposing lens 33, forms images of the first lenses 311m of the first multi-lens array 311 in the vicinity of the image formation region of each of the light modulators 400R, 400G, 400B.

The illumination light WL having passed through the optical integration system 31 enters the polarization converter 32. The polarization converter 32 is formed of polarization separation films and retardation films arranged in an array. The polarization converter 32 aligns the polarization directions of the illumination light WL with one another so that the illumination light WL has a predetermined polarization direction. Specifically, the polarization converter 32 aligns the polarization directions of the illumination light WL with the direction of the transmission axis of the light-incident-side polarizers of the light modulators 400R, 400G, 400B.

As a result, the polarization directions of the red light LR, the green light LG, and the blue light LB separated from the illumination light WL having passed through the polarization converter 32 coincide with the direction of the transmission axis of the light-incident-side polarizers of the light modulators 400R, 400G, 400B. The red light LR, the green light LG, and the blue light LB are therefore not blocked by the light-incident-side polarizers but are incident on the image formation areas of the light modulators 400R, 400G, 400B.

The illumination light WL having passed through the polarization converter 32 enters the superimposing lens 33.

The superimposing lens 33 cooperates with the optical integration system 31 to homogenize the illuminance distribution at the illumination receiving areas.

Now, assume imaginary rectangles S0 and S1, which circumscribe the four ellipses that are the cross-sectional shapes of the first to fourth light beams LB1, LB2, LB3, and LB4 that form a light flux, as shown in FIG. 4, and out of the edges of the rectangles S0 and S1, the length of one edge parallel to the axis X is defined as the light flux width in the axis-X direction, and the length of one edge parallel to the axis Y is defined as the light flux width in the axis-Y direction. Further, the greater one of the light flux width in the axis-X direction and the light flux width in the axis-Y direction divided by the smaller one of the two light flux widths is defined as the aspect ratio of the light flux.

The first to fourth light beams LB1, LB2, LB3, and LB4 outputted from the light emitters 61, 62, 63, and 64 are arranged in a row in the axis-X direction in a first position on the light incident side of the first optical section 53 and the second optical section 54, as shown in FIG. 4. The cross section of the light flux in the first position is therefore the rectangle S0 elongated in the axis-X direction. That is, the aspect ratio B0/A0 of the light flux is far greater than 1.

In contrast, the first to fourth light beams LB1, LB2, LB3, and LB4 outputted from the light emitters 61, 62, 63, and 64 are arranged in a second position on the light exiting side of the first optical section 53 and the second optical section 54 in such a way that the first light beam LB1 and the fourth light beam LB4 are arranged in the axis-X direction, and the second light beam LB2 and the third light beam LB3 face each other in the axis-Y direction with the reference line K sandwiched therebetween. The cross-sectional shape of the light flux in the second position is therefore the rectangle S1, which is closer to a square than the cross-sectional shape of the light flux in the first position. That is, the aspect ratio B1/A1 of the light flux is closer to 1 than the aspect ratio B0/A0. The aspect ratio B1/A1 of the light flux can be adjusted as appropriate by changing the distance between the two reflection surfaces of the prisms that form each of the optical sections 53 and 54.

Now focus on the illuminance distribution of each of the light fluxes that enter the optical integration system 31.

As for the aspect ratio of the blue light flux, even after the light flux is diffusively reflected off the diffusive reflector 341 of the wavelength converter 27, it is believed that the aspect ratio of the light flux before the diffusive reflection is substantially maintained. Therefore, assuming a projector according to Comparative Example and including no optical sections in the present embodiment, a blue light flux having a cross-sectional shape elongated in one direction enters the optical integration system 31 in the projector according to Comparative Example.

On the other hand, as for the aspect ratio of the yellow light flux, since the phosphor layer 34 has a planar shape substantially similar to the shape of the illumination receiving area of each of the light modulators 400B, 400G, and 400R, it is believed that the aspect ratio of the planar shape of the phosphor layer 34 is substantially maintained as the aspect ratio of the yellow light flux. A yellow light flux having an aspect ratio corresponding to the shape of the illumination receiving area of each of the light modulators 400B, 400G, and 400R therefore enters the optical integration system 31.

In the projector according to Comparative Example, since the blue light flux and the yellow light flux having aspect ratios greatly different from each other enter the optical integration system 31, the degree of the homogenization of the blue light flux at the illumination receiving area of the light modulator for blue light 400B greatly differs from the degree of the homogenization of the green light flux at the illumination receiving area of the light modulator for green light 400G and the degree of the homogenization of the red light flux at the illumination receiving area of the light modulator for red light 400R. As a result, the problem of color unevenness in a projected image occurs.

In contrast, in the projector 1 according to the present embodiment, the first optical section 53 and the second optical section 54 adjust the aspect ratio of the blue light flux, whereby the aspect ratio of the blue light flux can be so adjusted as to be substantially equal to the aspect ratio of the yellow light flux. As a result, since the blue light flux and the yellow light flux having substantially the same aspect ratio enter the optical integration system 31, the degree of the homogenization of the blue light flux at the illumination receiving area of the light modulator for blue light 400B is substantially equal to the degree of the homogenization of the green light flux at the illumination receiving area of the light modulator for green light 400G and the degree of the homogenization of the red light flux at the illumination receiving area of the light modulator for red light 400R.

For example, a light source apparatus including 20 semiconductor lasers arranged in 5 columns with four semiconductor lasers each has been provided in related art. When the light source apparatus is used, 20 light beams are outputted in the form of an array formed of 4 rows by 5 columns. In this case, the light flux formed of the light beams has a cross-sectional shape that is not greatly elongated, and the problem with the projector according to Comparative Example described above therefore does not occur. To achieve a projector that aims, for example, at a small size, low cost, and low luminance, the number of semiconductor lasers of the aforementioned light source apparatus including the 20 semiconductor lasers is excessive in some cases.

In this case, it is conceivable to employ a light source apparatus including four semiconductor lasers arranged in a row, as described in the aforementioned embodiment. When the light flux from the light source apparatus is caused to directly enter the optical integration system, the problem of color unevenness in the projector according to Comparative Example described above occurs. The configuration in the present embodiment is therefore suitable for a projector that aims, for example, at a small size, low cost, and low luminance and allows a projector that excels in image quality with small amounts of color unevenness, brightness unevenness, and other types of unevenness to be achieved.

In the present embodiment, since the first optical section 53 includes the first prism 65, which shifts the second light beam LB2 in the axis-Y direction, and the second prism 66, which shifts the second light beam LB2 in the axis-X direction, the position to which the light fluxes are each shifted, that is, the cross-sectional shape of the light flux can be adjusted precisely, readily, and inexpensively, as compared, for example, with a case where a first optical section having reflection surfaces formed of individual mirrors is used. Since the angle between the first reflection surface 65a and the second reflection surface 65b of the first prism 65 and the angle between the third reflection surface 66a and the fourth reflection surface 66b of the second prism 66 are determined in the step of manufacturing the first prism 65 and the second prism 66, the reflection surfaces can be relatively readily so formed as to precisely incline by 45° with respect to the light traveling direction. In contrast, when the reflection surfaces are formed of individual mirrors, it is extremely difficult to adjust the orientation of each of the mirrors in such a way that the mirror precisely inclines by 45° with respect to the light traveling direction. The second optical section 54 also provides the same effects as those provided by the first optical section 53.

In the present embodiment, in which the first optical section 53 includes the first prism 65 and the second prism 66, changing the arrangement of the first prism 65 and the second prism 66 from the arrangement in the present embodiment allows the second prism 66 to shift the second light beam LB2 in the axis-X direction then the first prism 65 to shift the second light beam LB2 in the axis-Y direction to achieve the arrangement of the four light beams shown in FIG. 4. However, in the present embodiment, in which the first prism 65 shifts the second light beam LB2 in the axis-Y direction and then the second prism 66 shifts the second light beam LB2 in the axis-X direction, the first optical section 53 having a simple configuration can be achieved with no interference between the prisms of the first optical section 53 and the prisms of the second optical section 54. The second optical section 54 also provides the same effect as that provided by the first optical section 53.

In the present embodiment, in which the second light beam LB2 and the third light beam LB3 shift along the axis-Y direction but in opposite directions and further shift along the axis-X direction but in opposite directions, a light flux having a rotationally symmetric shape around the center of rotation can be readily formed, as shown in FIG. 4.

In the present embodiment, in which the illuminator 100 includes the wavelength converter 27, which produces the yellow fluorescence YL, only the semiconductor lasers that each output blue light can be used to achieve the illuminator 100 that outputs white illumination light.

Second Embodiment

A second embodiment of the present disclosure will be described below with reference to FIGS. 5 and 6.

The basic configuration of a projector according to the second embodiment is the same as that in the first embodiment, and the second embodiment differs from the first embodiment in terms of the configuration of the light source apparatus. No overall description of the projector will therefore be made.

Figure 5:
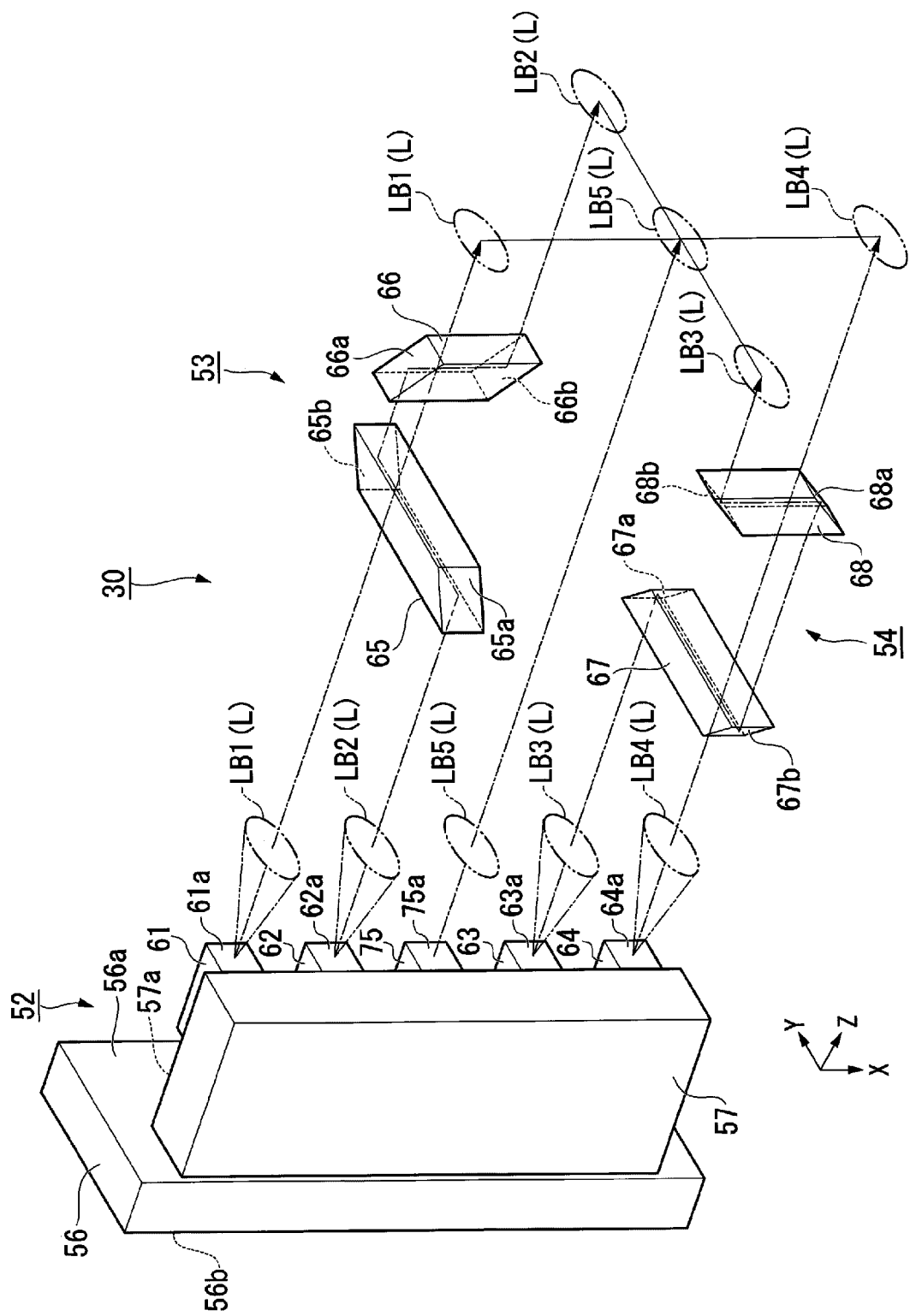
FIG. 5 is a perspective view of a light source apparatus in a second embodiment.

FIG. 5 is a perspective view of a light source apparatus 30 in the second embodiment. FIG. 6 shows the paths along which the optical sections 53 and 54 cause light to travel.

Figure 6:
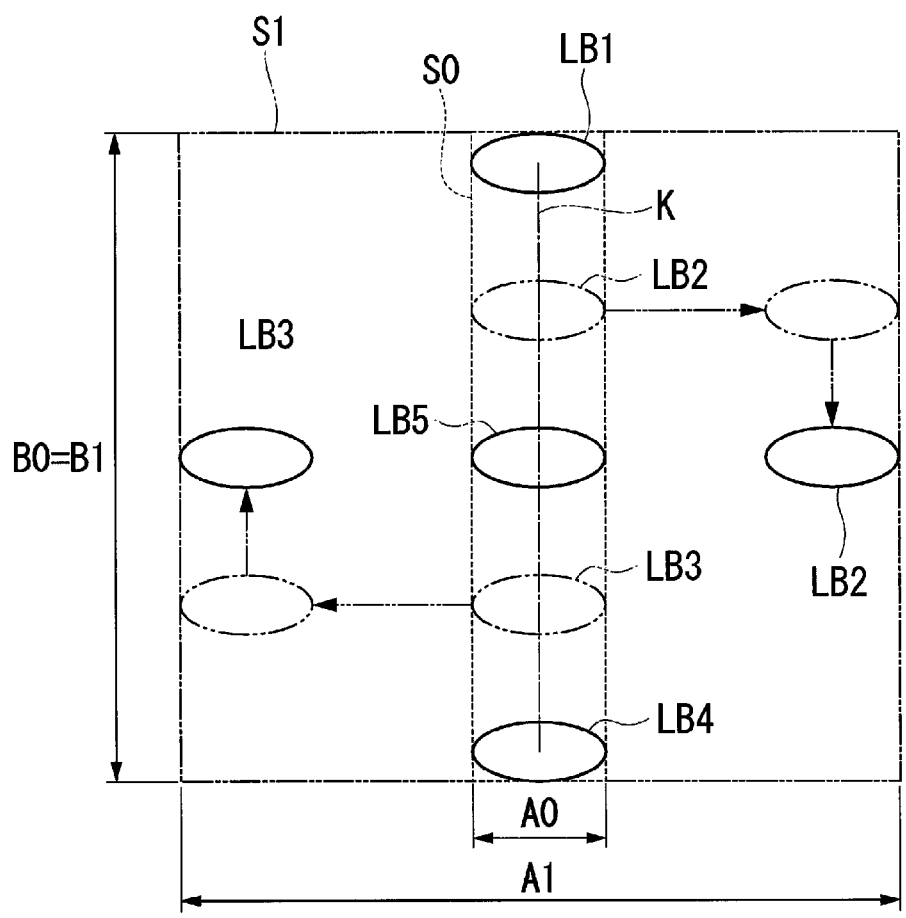
FIG. 6 shows the paths along which the optical sections cause light to travel.

In FIGS. 5 and 6, components common to those in the drawings used in the first embodiment have the same reference characters and will not be described.

In the light source apparatus 30 in the present embodiment, a light source section 52 includes the substrate 56, the support member 57, the first light emitter 61, the second light emitter 62, the third light emitter 63, the fourth light emitter 64, and a fifth light emitter 75, as shown in FIG. 5.

The plurality of light emitters 61, 62, 75, 63, and 64 are arranged on the mounting surface 57a of the support member 57 at intervals along the axis-X direction. In the present embodiment, the first light emitter 61, the second light emitter 62, a fifth light emitter 75, the third light emitter 63, and the fourth light emitter 64 provided in the light source section 52 are sequentially arranged in a row along the axis-X direction. That is, the light source section 52 further includes the fifth light emitter 75 located between the second light emitter 62 and the third light emitter 63 in the axis-X direction in addition to the same first light emitter 61, second light emitter 62, third light emitter 63, and fourth light emitter 64 as those in the first embodiment.

The configurations of the first optical section 53 and the second optical section 54 are the same as those in the first embodiment. That is, the first optical section 53 includes the first prism 65 (first optical element), which shifts in the axis-Y direction the second light beam LB2 outputted from the second light emitter 62, and the second prism (second optical element), which shifts in the axis-X direction the second light beam LB2 outputted from the second light emitter 62. The second optical section 54 includes the third prism 67 (third optical element), which shifts in the axis-Y direction the third light beam LB3 outputted from the third light emitter 63, and the fourth prism 68 (fourth optical element), which shifts in the axis-X direction the third light beam LB3 outputted from the third light emitter 63.

A fifth light beam LB5 outputted via a light emitting surface 75a of the fifth light emitter 75 passes in the axis-X direction through the space between the first reflection surface 65a of the first prism 65 and the fifth reflection surface 67a of the third prism 67 and do not enter the first optical section 53 or the second optical section 54 but travels straight.

The effects of the first optical section 53 and the second optical section 54 are also the same as those provided in the first embodiment, as shown in FIG. 6. The first prism 65 in the first optical section 53 shifts the second light beam LB2 outputted from the second light emitter 62 toward the right side in FIG. 6, which is one side in the axis-Y direction, and the second prism 66 then shifts the second light beam LB2 toward the lower side in FIG. 6, which is one side in the axis-X direction. The third prism 67 in the second optical section 54 shifts the third light beam LB3 outputted from the third light emitter 63 toward the left side in FIG. 6, which is the other side in the axis-Y direction, and the fourth prism 68 then shifts the third light beam LB3 toward the upper side in FIG. 6, which is the other side in the axis-X direction.

On the other hand, the first light beam LB1 outputted from the first light emitter 61, the fifth light beam LB5 outputted from the fifth light emitter 75, and the fourth light beam LB4 outputted from the fourth light emitter 64 do not enter the first optical section 53 or the second optical section 54 but travel straight. As a result, the plurality of light beams LB1, LB2, LB5, LB3, and LB4 outputted from the plurality of light emitters 61, 62, 75, 63, and 64 are arranged in a position after the second light beam LB2 and the third light beam LB3 exit out of the first optical section 53 and the second optical section 54 in such a way that the first light beam LB1, the fifth light beam LB5, and the fourth light beam LB4 are arranged in the axis-X direction and the second light beam LB2 and the third light beam LB3 face each other in the axis-Y direction with the fifth light beam LB5 sandwiched therebetween.

In the present embodiment, in which the fifth light beam LB5 is located at the center of the light flux, the presence or absence of the fifth light flux LB5 does not affect the aspect ratio of the light flux. The description on the aspect ratio of the light flux is therefore the same as that made in the first embodiment.

The present embodiment also provides the same effects as those provided by the first embodiment, for example, a projector that excels in image quality with small amounts of color unevenness, brightness unevenness, and other types of unevenness can be achieved, the cross-sectional shape of the light flux can be adjusted precisely, readily, and inexpensively, and optical sections each having a simple configuration can be achieved.

Further, in the present embodiment, in which the light source section 52 includes 5 light emitters 61, 62, 75, 63, and 64, a brighter image than the image achieved by the projector according to the first embodiment can be produced.

Third Embodiment

A third embodiment of the present disclosure will be described below with reference to FIG. 7.

The basic configuration of a projector according to the third embodiment is the same as that in the first embodiment, and the third embodiment differs from the first embodiment in terms of the configuration of the light source apparatus. No overall description of the projector will therefore be made.

Figure 7:
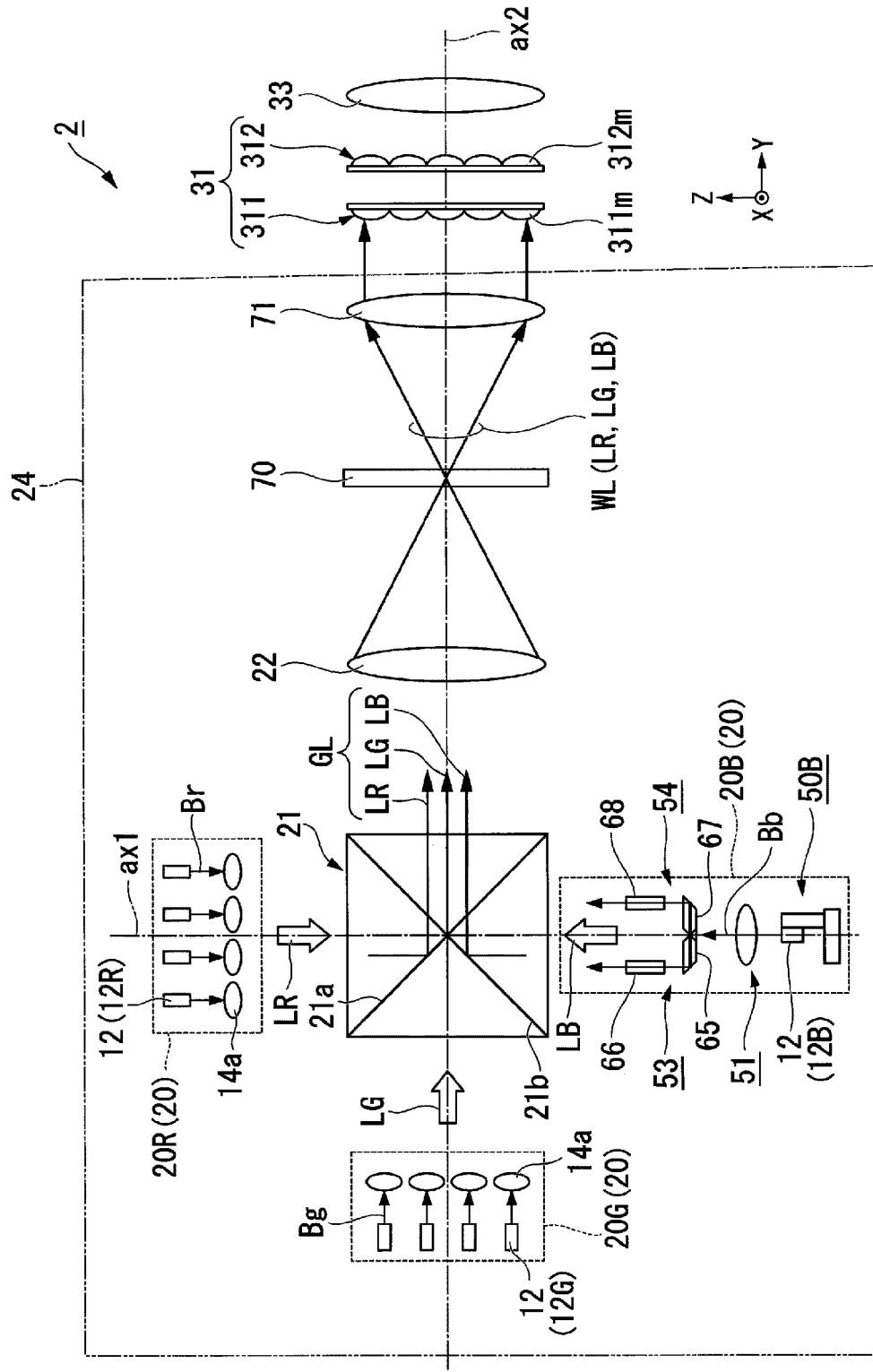
FIG. 7 is a schematic configuration diagram of an illuminator in a third embodiment.

FIG. 7 is a schematic configuration diagram of an illuminator in the third embodiment.

In FIG. 7, components common to those in the drawings used in the first embodiment have the same reference characters and will not be described.

A light source apparatus in the third embodiment differs from the light source apparatus in the first embodiment, includes no wavelength converter but includes a plurality of light emitters that output color light beams having colors different from one another, and combines the color light beams having colors different from one another with one another to form white illumination light.

An illuminator 2 in the present embodiment includes a light source apparatus 24, the optical integration system 31, and the superimposing lens 33, as shown in FIG. 7.

The light source apparatus 24 includes a light source apparatus for red light 20R, a light source apparatus for green light 20G, a light source apparatus for blue light 20B, a light combining optical element 21, a light collection lens 22, a diffuser 70, and a pickup lens 71.

In the present embodiment, the light source apparatus for red light 20R, the light combining optical element 21, and the light source apparatus for blue light 20B are provided along an optical axis ax1 of the light source apparatus for red light 20R. The light source apparatus for green light 20G, the light combining optical element 21, the light collection lens 22, the diffuser 70, the pickup lens 71, the optical integration system 31, and the superimposing lens 33 are provided along an illumination optical axis ax2 of the illuminator 2. The optical axis ax1 and the illumination optical axis ax2 are perpendicular to each other. The optical axis of the light source apparatus for blue light 20B coincides with the optical axis ax1 of the light source apparatus for red light 20R, and the optical axis of the light source apparatus for green light 20G coincides with the illumination optical axis ax2.

The light source apparatus for red light 20R outputs a red light flux LR formed of a plurality of red light beams Br. The light source apparatus for green light 20G outputs a green light flux LG formed of a plurality of green light beams Bg. The light source apparatus for blue light 20B outputs a blue light flux LB formed of a plurality of blue light beams Bb.

An XYZ orthogonal coordinate system having the following directions is used in the following description: The direction in which the illuminator 2 outputs the illumination light WL is an axis-Y direction; the direction in which the light source apparatus for red light 20R outputs the red light flux LR is an axis-Z direction; and the direction perpendicular to the axis-Y and axis-Z directions and extending from the far side of the plane of view from the viewer toward the near side thereof to the viewer is an axis-X direction.

The configuration of the light source apparatus for red light 20R will be described below. The light source apparatus for green light 20G has the same configuration as that of the light source apparatus for red light 20R except for the wavelength of the outputted light and will not therefore be described.

The light source apparatus for red light 20R includes 20 red light emitters 12R. The light source apparatus for red light 20R is so configured that 5 red light emitters 12R are arranged in the axis-X direction to forma light emitter column and four light emitter columns are arranged in the axis-Y direction. The red light emitters 12R are each formed of a semiconductor laser that outputs the red light beam Br, which belongs, for example, to a wavelength range from 585 to 720 nm.

The thus configured light source apparatus for red light 20R outputs the red light flux LR formed of a parallel light flux toward the light combining optical element 21.

The configuration of the light source apparatus for blue light 20B will next be described.

In the present embodiment, the light source apparatus for blue light 20B is formed of the same light source apparatus 20 as that in the first embodiment. That is, the light source apparatus for blue light 20B includes a blue light source section 50B, the collimator system 51, the first optical section 53, and the second optical section 54, as shown in FIG. 7. The first optical section 53 includes the first prism 65 and the second prism 66. The second optical section 54 includes the third prism 67 and the fourth prism 68.

The blue light emitters 12B each output the blue light beam Bb, which belongs to the wavelength range, for example, from 380 to 495 nm. The blue light source section 50B differs from the light source apparatus for red light 20R, in which the red light emitters 12R are arranged in a matrix formed of 5 rows by 4 columns, in that four blue light emitters 12B are arranged in a row along the axis-X direction.

Since the light emission efficiency of a semiconductor laser varies on an emitted light color basis, and the optical output power of a semiconductor laser also varies on an emitted light color basis. The light emission efficiency of the blue light emitters 12B is higher than the light emission efficiency of the red light emitters 12R and the light emission efficiency of the green light emitters 12G. The optical output power of the blue light emitters 12B is therefore higher than the optical output power of the red light emitters 12R and the optical output power of the green light emitters 12G.

As an example, the light source apparatus for red light 20R, the light source apparatus for green light 20G, and the light source apparatus for blue light 20B need to output, for example, a 22-W red light flux LR, a 14-W green light flux LG, and a 9-W blue light flux LB to produce white light having a brightness of 6000 lm. In general, one blue light emitter 12B outputs light having about 2.3 W, one red light emitter 12R outputs light having about 1.1 W, and one green light emitter 12G outputs light having about 0.7 W.

Approximate calculation using the optical output power values from the light emitters and the optical output power per light emitter described above shows that at least about 20 light source apparatuses for red light 20R, about 20 light source apparatuses for green light 20G, and about 4 to 5 light source apparatuses for blue light 20B are necessary for generation of white light having the brightness of 6000 lm.

Provided that the number of red light emitters 12R, the number of green light emitters 12G, and the number of blue light emitters 12B are equal to one another, that is, the light source apparatus for red light 20R and the light source apparatus for green light 20G are each provided in the form of the same multi-emitter package as that of the light source apparatus for blue light 20B, the blue light flux LB has excessive output power. In this case, it is difficult to produce white light having appropriate white balance as the illumination light WL.

In contrast, in the illuminator 2 in the present embodiment, the number of blue light emitters 12B is 4, and the number of red light emitters 12R and the number of green light emitters 12G are each 20, as described above. The situation in which the blue light flux LB has excessive output power can thus be suppressed, whereby white illumination light WL having satisfactory white balance can be produced.

The light combining optical element 21 combines the red light flux LR, the green light flux LG, and the blue light flux LB outputted from the light source apparatus 20 with one another. The light combining optical element 21 is formed of a cross dichroic prism.

The light collection lens 22 is formed of a convex lens. The light collection lens 22 causes the combined light flux GL to converge and causes the convergent light flux GL to enter the diffuser 70. The diffuser 70 is disposed on the light exiting side of the light collection lens 22. The diffuser 70 diffuses the combined light flux GL to suppress occurrence of speckles that lower the quality of the displayed light flux GL.

The diffuser 70 can be a known diffuser plate, for example, a ground glass plate, a holographic diffuser, a transparent substrate having a blasted surface, or a transparent substrate having beads or any other scatterers dispersed therein.

A configuration in which the diffuser 70 is rotated around a predetermined axis of rotation may be employed. Rotating the diffuser 70 as described above temporally changes the state in which the light passing through the diffuser 70 is diffused to temporally change a speckle pattern. A speckle pattern averaged over time is therefore recognized by a viewer, whereby the speckle noise can be unlikely to be recognizable as compared with a case where the diffuser 70 is not rotated.

The red light flux LR, the green light flux LG, and the blue light flux LB diffused by the diffuser 70 are combined with one another to produce the white illumination light WL. The illumination light WL is parallelized by the pickup lens and enters the optical integration system 31. The configurations of the optical integration system 31 and the superimposing lens 33 are the same as those in the first embodiment.

In the illuminator 2 of the present embodiment, the light source apparatus for blue light 20B includes the blue light source section 50B, in which four blue light emitters 12B are arranged in a row in the axis-X direction, unlike the light source apparatus for red light 20R and the light source apparatus for green light 20G, from the viewpoint of generation of the white illumination light WL having satisfactory white balance. The aspect ratio of the blue light flux LB therefore greatly differs from the aspect ratios of the red light flux LR and the green light flux LG, and the illuminance distribution of the blue light flux LB greatly differs from the illuminance distributions of the red light flux LR and the green light flux LG accordingly in the optical integration system 31, undesirably resulting in a possibility of color unevenness in a projected image.

To address the problem described above, in the illuminator 2 of the present embodiment, the light source apparatus for blue light 20B includes the first optical section 53 and the second optical section 54, as in the first embodiment, which allows the aspect ratio of the blue light flux LB to approach the aspect ratios of the red light flux LR and the green light flux LG. The thus configured illuminator 2 allows the illuminance distribution of the blue light flux LB to match with the illumination distributions of the red light flux LR and the green light flux LG in the optical integration system 31, whereby occurrence of color unevenness in a projected image can be suppressed.

The light source apparatus 30 described in the second embodiment can also be used as the light source apparatus for blue light 20B. That is, the light source section 52 of the light source apparatus 30 described in the second embodiment can be used as the blue light source section 50B of the light source apparatus for blue light 20B. In this case, the blue light source section 50B includes 5 blue light emitters 12B arranged in a row in the axis-X direction, and the number of light emitters in the blue light source apparatus 20B necessary for the 6000-lm white light is at least about 4 to 5, whereby the same effect as that provided when the number of blue light emitters 12B is 4 can be provided.

First Variation

A first variation below may be employed in all the embodiments described above.

Figure 8:
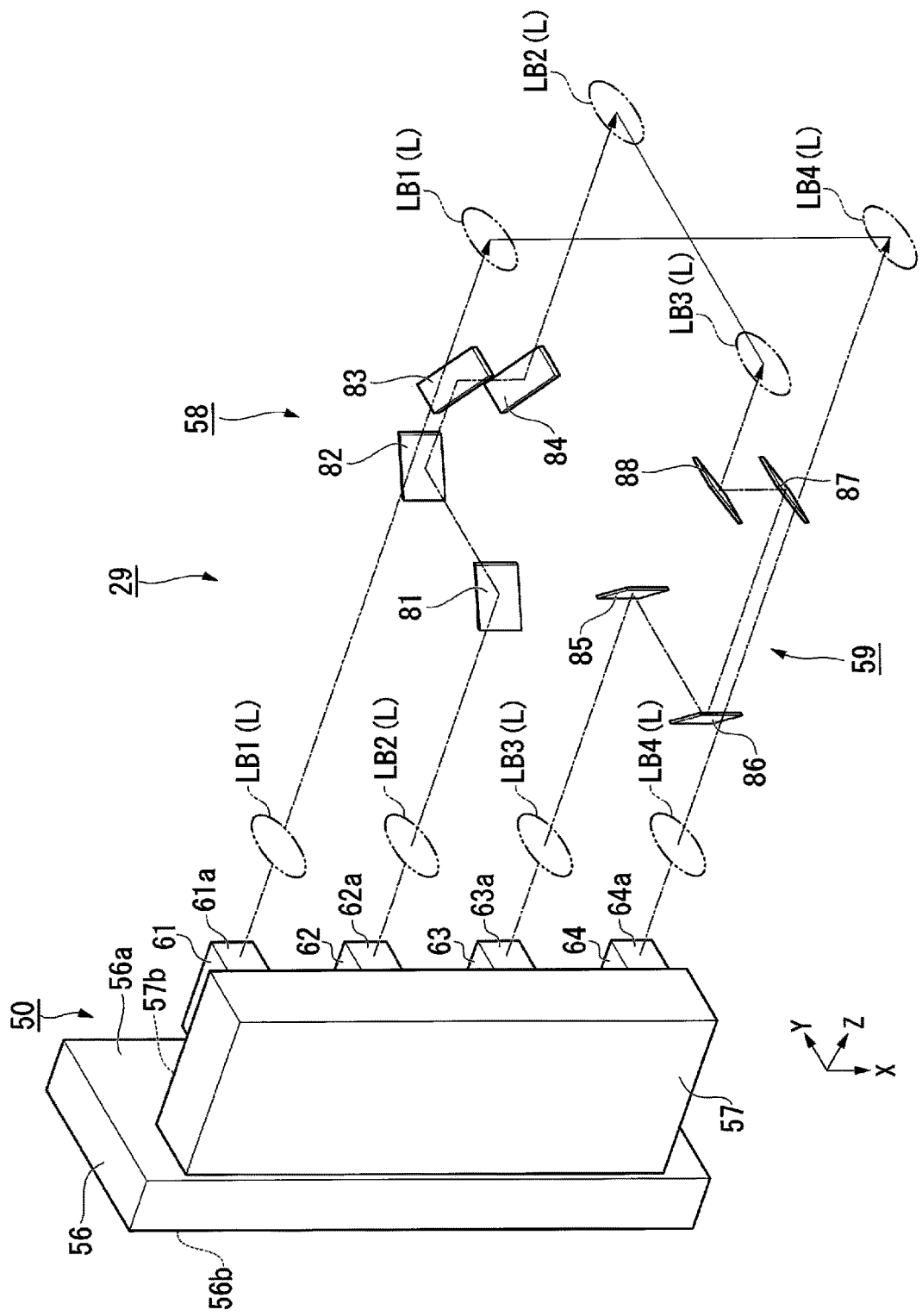
FIG. 8 is a perspective view of a light source apparatus in a first variation.

FIG. 8 is a perspective view of a light source apparatus in the first variation.

A light source apparatus 29 in the present variation includes the light source section 50, the collimator system (not shown), a first optical section 58, and a second optical section 59, as shown in FIG. 8. The configurations of the light source section 50 and the collimator system are the same as those in the first embodiment.

The first optical section 58 includes a first mirror 81 (first reflection surface) and a second mirror 82 (second reflection surface), which shift in the axis-Y direction the second light beam LB2 outputted from the second light emitter 62, and a third mirror 83 (third reflection surface) and a fourth mirror 84 (fourth reflection surface), which shift in the axis-X direction the second light beam LB2 outputted from the second light emitter 62.

The second optical section 59 includes a fifth mirror (fifth reflection surface) and a sixth mirror 86 (sixth reflection surface), which shift in the axis-Y direction the third light beam LB3 outputted from the third light emitter 63, and a seventh mirror 87 (seventh reflection surface) and an eighth mirror 88 (eighth reflection surface), which shift in the axis-X direction the third light beam LB3 outputted from the third light emitter 63.

That is, in the embodiments described above, the optical sections each include two prisms each having two reflection surfaces and may instead each be formed of mirrors in place of each of the prisms disposed in the positions of the reflection surfaces of the prism.

The present variation also provides the same effects as those provided by the first embodiment, for example, a projector that excels in image quality with small amounts of color unevenness, brightness unevenness, and other types of unevenness can be achieved, the cross-sectional shape of the light flux can be adjusted precisely, readily, and inexpensively, and optical sections each having a simple configuration can be achieved.

In the present variation, the light source section 50 of the light source apparatus 29 may be replaced with the light source section 52 including 5 light emitters described in the second embodiment. Even when the light source section 52 is used in the light source apparatus 29, the same optical systems as those of the first optical section 53 and the second optical section 54 can be used.

Second Variation

A second variation below may be employed in all the embodiments described above.

In the embodiments described above, the light beams outputted from some of the light emitters travel straight and enter the optical sections. The configuration described above may be replaced with a configuration in which the light beams outputted from some of the light emitters are reflected off prisms and then enter the optical sections.

The present variation also provides the same effects as those provided by the first embodiment, for example, a projector that excels in image quality with small amounts of color unevenness, brightness unevenness, and other types of unevenness can be achieved, the cross-sectional shape of the light flux can be adjusted precisely, readily, and inexpensively, and optical sections each having a simple configuration can be achieved.

The technical range of the present disclosure is not limited to those in the embodiments described above, and a variety of changes can be made to the embodiments to the extent that the changes do not depart from the substance of the present disclosure.

For example, in each of the embodiments described above, the light source apparatus includes a fixed wavelength converter configured not to be rotatable and may instead include a wavelength converter configured to be rotatable with a motor or any other drive source.

In addition to the above, the shape, the number, the arrangement, the material, and other specific descriptions of the components of the light source apparatus and the projector are not limited to those in the embodiments described above and can be changed as appropriate. In the embodiments described above, the present disclosure is applied to a projector using liquid crystal valves by way of example, but not necessarily. The present disclosure may be applied to a projector using digital micromirror devices as the light modulators.

What is claimed is:

1. A projector comprising:
   a light source apparatus including
      a light source including a first light emitter, a second light emitter, a third light emitter, and a fourth light emitter sequentially arranged in a row along a first direction that intersects a light exiting direction,
      a first optical structure that shifts a light beam outputted from the second light emitter of the light source in a second direction that intersects the light exiting direction and the first direction and shifts the light beam outputted from the second light emitter of the light source to a position adjacent to a light beam outputted from the third light emitter of the light source, and
      a second optical structure that shifts the light beam outputted from the third light emitter of the light source in the second direction and shifts the light beam outputted from the third light emitter of the light source to a position adjacent to the light beam outputted from the second light emitter of the light source that is a position different from the position of the light beam outputted from the second light emitter;
   a light modulator that modulates light outputted from the light source apparatus in accordance with image information to produce image light; and
   a projection optical apparatus that projects the image light,
   wherein the first optical structure includes a first optical element that shifts the light beam outputted from the second light emitter in the second direction and a second optical element that shifts the light beam outputted from the second light emitter in the first direction,
   wherein the first optical element has a first reflection surface that reflects the light beam outputted from the second light emitter in the second direction and a second reflection surface that reflects the light beam reflected off the first reflection surface in the light exiting direction, and
   wherein the second optical element has a third reflection surface that reflects the light beam reflected off the second reflection surface in the first direction and a fourth reflection surface that reflects the light beam reflected off the third reflection surface in the light exiting direction.

2. The projector according to claim 1,
   wherein the second optical structure includes a third optical element that shifts the light beam outputted from the third light emitter in the second direction and a fourth optical element that shifts the light beam outputted from the third light emitter in the first direction.

3. The projector according to claim 1,
   wherein the second optical structure includes a third optical element that shifts the light beam outputted from the third light emitter in the second direction and a fourth optical element that shifts the light beam outputted from the third light emitter in the first direction.

4. The projector according to claim 3,
   wherein the third optical element has a fifth reflection surface that reflects the light beam outputted from the third light emitter in the second direction and a sixth reflection surface that reflects the light beam reflected off the fifth reflection surface in the light exiting direction, and
   the fourth optical element has a seventh reflection surface that reflects the light beam reflected off the sixth reflection surface in the first direction and an eighth reflection surface that reflects the light beam reflected off the seventh reflection surface in the light exiting direction.

5. The projector according to claim 1,
   wherein the light beam outputted from the second light emitter and the light beam outputted from the third light emitter are shifted along the second direction and are shifted in opposite directions.

6. The projector according to claim 1,
   wherein the light beam outputted from the second light emitter and the light beam outputted from the third light emitter are shifted along the first direction and are shifted in opposite directions.

7. The projector according to claim 1,
   wherein the light source apparatus further includes a wavelength converter on which the light beam outputted from each of the first, second, third, and fourth light emitters is incident.

8. The projector according to claim 1,
   wherein the light beam outputted from each of the first, second, third, and fourth light emitters has an elliptical cross-sectional shape perpendicular to a chief ray of the light beam,
   a minor axis direction of the elliptical shape coincides with the first direction, and a major axis direction of the elliptical shape coincides with the second direction.

9. The projector according to claim 1,
wherein the light source further includes a fifth light emitter located between the second light emitter and the third light emitter in the first direction.

10. The projector according to claim 1,
wherein the light beam outputted from the second light emitter and the light beam outputted from the third light emitter are shifted along the second direction and are shifted in opposite directions.

11. The projector according to claim 1,
wherein the light beam outputted from the second light emitter and the light beam outputted from the third light emitter are shifted along the first direction and are shifted in opposite directions.

12. The projector according to claim 1,
the second connection information is communicated via short-range wireless wherein the light beam outputted from each of the first, second, third, and fourth light emitters has an elliptical cross-sectional shape perpendicular to a chief ray of the light beam,
a minor axis direction of the elliptical shape coincides with the first direction, and
a major axis direction of the elliptical shape coincides with the second direction.

13. The projector according to claim 1,
wherein the light source further includes a fifth light emitter located between the second light emitter and the third light emitter in the first direction.

14. A projector comprising:
a light source apparatus including
   a light source including a first light emitter, a second light emitter, a third light emitter, and a fourth light emitter sequentially arranged in a row along a first direction that intersects a light exiting direction,
   a first optical structure that shifts a light beam outputted from the second light emitter of the light source in a second direction that intersects the light exiting direction and the first direction and shifts the light beam outputted from the second light emitter of the light source to a position adjacent to a light beam outputted from the third light emitter of the light source, and
   a second optical structure that shifts the light beam outputted from the third light emitter of the light source in the second direction and shifts the light beam outputted from the third light emitter of the light source to a position adjacent to the light beam outputted from the second light emitter of the light source that is a position different from the position of the light beam outputted from the second light emitter;
a light modulator that modulates light outputted from the light source apparatus in accordance with image information to produce image light; and
a projection optical apparatus that projects the image light,
wherein the second optical structure includes a third optical element that shifts the light beam outputted from the third light emitter in the second direction and a fourth optical element that shifts the light beam outputted from the third light emitter in the first direction,
wherein the third optical element has a fifth reflection surface that reflects the light beam outputted from the third light emitter in the second direction and a sixth reflection surface that reflects the light beam reflected off the fifth reflection surface in the light exiting direction, and
wherein the fourth optical element has a seventh reflection surface that reflects the light beam reflected off the sixth reflection surface in the first direction and an eighth reflection surface that reflects the light beam reflected off the seventh reflection surface in the light exiting direction.

15. The projector according to claim 14,
wherein the first optical structure includes a first optical element that shifts the light beam outputted from the second light emitter in the second direction and a second optical element that shifts the light beam outputted from the second light emitter in the first direction.

16. The projector according to claim 15,
outputted from the second light emitter in the second direction and a second reflection surface that reflects the light beam reflected off the first reflection surface in the light exiting direction, and
the second optical element has a third reflection surface that reflects the light beam reflected off the second reflection surface in the first direction and a fourth reflection surface that reflects the light beam reflected off the third reflection surface in the light exiting direction.

17. The projector according to claim 14,
wherein the light beam outputted from the second light emitter and the light beam outputted from the third light emitter are shifted along the second direction and are shifted in opposite directions.

18. The projector according to claim 14,
wherein the light beam outputted from the second light emitter and the light beam outputted from the third light emitter are shifted along the first direction and are shifted in opposite directions.

19. The projector according to claim 14,
wherein the light beam outputted from each of the first, second, third, and fourth light emitters has an elliptical cross-sectional shape perpendicular to a chief ray of the light beam,
a minor axis direction of the elliptical shape coincides with the first direction, and
a major axis direction of the elliptical shape coincides with the second direction.

20. The projector according to claim 14,
wherein the light source further includes a fifth light emitter located between the second light emitter and the third light emitter in the first direction.

* * * * *